United States Patent
Sheppard

(10) Patent No.: US 6,411,312 B1
(45) Date of Patent: Jun. 25, 2002

(54) METHOD AND SYSTEM FOR TRANSFERRING DATA USING A GRAPHICAL USER INTERFACE

(75) Inventor: Percy Sheppard, South Wonston (GB)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/307,798

(22) Filed: May 10, 1999

(30) Foreign Application Priority Data

Jun. 30, 1998 (GB) .............................................. 9813976

(51) Int. Cl.⁷ ................................................ G06F 3/00
(52) U.S. Cl. ........................ 345/769; 345/794; 345/835
(58) Field of Search ................................ 345/700, 764, 345/766, 769, 770, 775–777, 781, 784, 788, 790, 794, 797, 810, 814, 835, 844, 856

(56) References Cited

U.S. PATENT DOCUMENTS

| | | | |
|---|---|---|---|
| 5,422,993 A | * 6/1995 | Fleming | 345/835 |
| 5,546,527 A | * 8/1996 | Fitzpatrick et al. | 345/769 |
| 5,548,702 A | 8/1996 | Li et al. | 345/769 |
| 5,583,984 A | * 12/1996 | Conrad et al. | 345/769 |
| 5,634,095 A | * 5/1997 | Wang et al. | 345/763 |
| 5,745,112 A | 4/1998 | Hirose | 345/769 |
| 5,870,092 A | * 2/1999 | Bedford-Roberts | 345/776 |
| 6,040,833 A | * 3/2000 | Henshaw | 345/794 |
| 6,097,391 A | * 8/2000 | Wilcox | 345/776 |
| 6,215,490 B1 | * 4/2001 | Kaply | 345/788 |

FOREIGN PATENT DOCUMENTS

EP  0 514 307 A3  4/1992

* cited by examiner

Primary Examiner—C. N. dela Torre
(74) Attorney, Agent, or Firm—Whitham, Curtis & Christofferson, P.C.; Louis J. Percello

(57) ABSTRACT

A system and method for controlling transfer of data using "dragging and dropping" on a graphical user interface where a target icon may be in a window layer obscured by other layers provides a special layer select icon over which a source icon may be dragged to initiate sequential display of obscured layers. The operator may then examine successively presented layers and select one on which a target icon is presented on which the source icon may be dropped.

14 Claims, 4 Drawing Sheets

METHOD AND SYSTEM FOR TRANSFERRING DATA USING A GRAPHICAL USER INTERFACE

FILED OF THE INVENTION

This invention relates generally to digital computers and particularly to a method for transferring data in such computers using a graphical user interface (GUI) and a system for performing such a method.

BACKGROUND OF THE INVENTION

Conventionally a digital computer operates under the control of an operating system (OS) which is a program loaded when the machine is initially switched on and which controls all operations thereafter and particularly operations involving the transfer of data between various applications run on the computer.

While in the past operating systems have performed such operations in response to explicit commands in predetermined text formats it is increasingly common for an operating system to present to a user a graphical user interface in which symbols, or icons, are displayed on the screen to represent the various objects accessible to the user. In a typical operating system, for example the IBM OS/2 operating system, an object can be a file or folder storing information, a particular application such as a word processor or a device such as a printer.

Access to the various objects is provided by using a pointing device, typically a so called mouse, which can be traversed across a tracking pad to cause a pointer to move around the display screen. When the pointer is placed on a desired object a button may be pressed on the mouse to select that object causing for example execution of a program in the case of an application or the presentation of data in the case of a folder or file. Further, data and other objects may be moved from one application to another by a process known as "dragging and dropping" in which pressure on a button on the mouse is maintained while the mouse is traversed from one object to another.

U.S. Pat. No. 5,548,702 solves the problem of how to drag and drop an object onto an area of a window which is currently off the edge of the display. Moving the dragged icon to the displayed window edge causes automatic scrolling of the window edge until the drop area is eventually displayed.

An operating system presenting a graphical user interface will normally permit a user to run more than one application at a time in a window which is opened on the screen. Also whenever any object is opened by a user a corresponding window is opened to display the contents of that object. Thus at any one time the screen of the display will be showing simultaneously many windows relating to the various objects that are open. Since space on the screen is limited these windows will be layered one on top of the other with only the current layer being clearly visible to the user, the remainder being wholly or partially obscured. Should a user wish to transfer data or other information between applications using the "drag and drop" technique a problem arises in locating a target icon which may be in any one of the obscured layers.

A partial solution to this problem is shown in EP 0514307 in which partly obscured windows are surfaced to the top of the display when the dragged icon is positioned over an exposed portion of the window. It is still necessary, however, for this invention to work, that some of the obscured window should be visible.

It is also known to provide layer selection representations such as buttons, notebook page tabs, page turners and the like to allow the user to scan through the various layers using point and select operations which cause selected layers to be displayed. This is inconvenient in that it requires a separate operation from that selecting an icon for "dragging and dropping". Such systems may not even permit an icon to be transferred between selected layers.

Two articles which address the problems of accessing hidden information in a graphical user interface are "Graphical Technique to Access Hidden Information" (Anon Research Disclosure No 30074, April 1989) and "3-D Scroll Bar" (Anon Research Disclosure No 30036, April 1989). The first shows a "prism" icon which when placed next to an object causes the display in an adjacent window of the next layer of information about the object. The second article facilitates control of movement between layers. Neither article specifically enables objects to be dragged from one layer and dropped into another.

It is accordingly an object of the present invention to provide an improved method and system for transferring data in a computer presenting a graphical user interface.

SUMMARY OF THE INVENTION

According to the invention there is provided a method of transferring data between layered windows presented by a graphical user interface in a digital computer, comprising the steps of selecting a source icon in one layer representing a data object using a pointing device and "dragging and dropping" said icon into another layer, said method being characterised by positioning the source icon on a layer select icon, such positioning causing successive layers of said windows to be presented to the user; and, in response to user selection of a particular layer for transfer by operation of said pointing device and user dragging and dropping of said source icon onto a target object in the selected layer by operation of said pointing device, causing data transfer to be performed to said target object.

There is further provided a system for controlling the transfer of data between objects presented on different layers of a graphical user interface in a digital computer by selecting a source icon representing a source object using a pointing device and dragging and dropping such icon on a target object, characterised by means for generating and displaying a layer select icon so positioned on said interface as to be visible whenever any layer is displayed thereon and sequencing means responsive to positioning of said source icon on said layer select icon by said pointing device to initiate successive presentation of said different layers to permit selection of a target object in a layer so presented.

In order to ensure that the layer select icon is visible whenever any layer is presented, it may conveniently be displayed in the same position in each layer. Alternatively it may be displayed in a reserved position on the screen which cannot be overlaid.

To prevent inadvertent initiation of the layer select operation a time delay may be included before such operation starts. Similarly an appropriate time delay may be provided between successive presentations of the layers to enable an operator to determine whether the required target icon is in a displayed layer.

In a preferred embodiment of the invention the layer select icon is in the form of a tunnel, the aperture of which is divided into two zones. Depending on whether the source icon is positioned on one or other of the two zones the layers are cycled forwards or backwards, the speed of cycling depending on the positioning of the icon within the zone.

In order that the invention may be well understood, a preferred embodiment thereof will now be described with reference to the accompanying drawings, in which.

DETAILED DESCRIPTION OF THE PREFERRED EMBODIMENT

Figure 1:
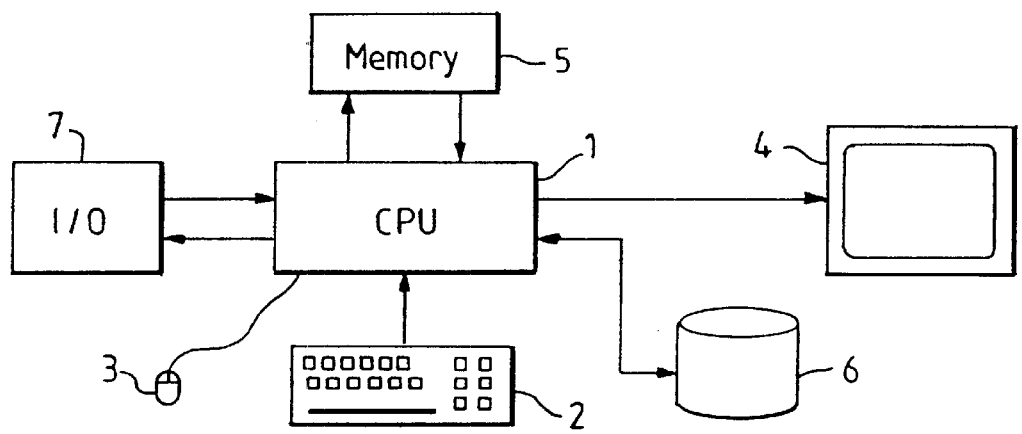
FIG. 1 is a block diagram of a digital computer showing the various components involved in performing the invention.

Referring to FIG. 1 there is shown in block diagram form a personal computer in which the invention is typically implemented. A central processing unit 1 operates under the control of a keyboard 2 and a pointing device or mouse 3 to perform a wide range of operations. A display 4 presents to the operator data currently being processed together with information showing the status of the system. A fast random access memory 5 is provided to store data and programs relating to work currently in progress and a relatively large storage device 6, conventionally a magnetic disc storage device, provides storage for programs and data which may be called by the machine as work progresses. Various input/output devices 7 such as communication lines, floppy disc read/write devices and printers may be attached to the central processing unit through appropriate interfaces.

Overall control of the system is by an operating system, in the embodiment to be described here the IBM OS/2 operating system (OS/2 is a trademark of IBM Corporation). On start-up, after various tests on the health of the system, the operating system is called from the storage device 6 and resides thereafter in the memory 5. When, as in the present invention, the operating system presents a graphical user interface (GUI), it maintains in the storage device 6 and in the memory several libraries and files to facilitate its control of the system. In particular it maintains a library of graphics files each representing in bit map form an icon associated with a particular object or file which may be displayed on the display 4 in a particular position on the screen. The operator may then use the mouse 3 to point to that particular icon to perform a selected operation on the associated application or file. One such operation with which the present invention is particularly concerned is a so called "drag and drop" operation in which an operator selects a source icon by operating a mouse button when pointing thereto, traverses the mouse holding the button depressed to a second target icon, and "drops" the source icon on the target icon by releasing the button, so causing data to be transferred from one object to another.

As has already been mentioned above an operating system such as the IBM OS/2 operating system permits a number of programs to run at any given time. Conventionally, whenever a program or other object is opened by the operator a "window" is opened by the operating system to display the various icons associated with that particular object. As other objects are opened further windows are created and since the display area of display 4 is limited, the operating system is required to arrange the open windows in various ways to maintain accessibility to the operator. Typically the operating system presents the open windows in layers with the current window fully visible in the uppermost layer, and maintains a layer list accessible to the operator to determine which layers are open. Necessarily the upper layers obscure those below.

Figure 2:
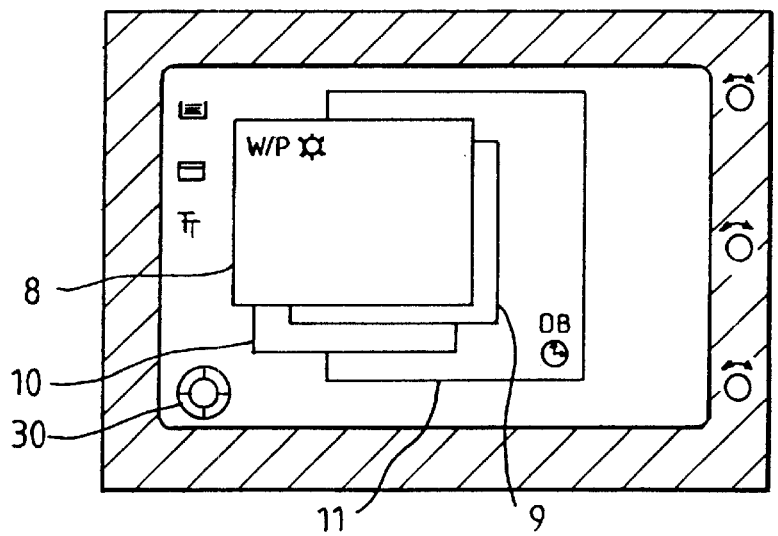
FIG. 2 shows a typical screen display indicating the layering of windows on which a layer select icon is displayed.

The resulting situation is illustrated in FIG. 2, where a layer 8 is fully accessible to the operator but obscures, partially or fully, other layers 9, 10 and 11 associated with other open objects. Thus while it is convenient to the operator to have a number of programs open at any one time, the facility to transfer data between programs is impeded by the fact that a destination object for a "drag and drop" operation is not readily visible when a source object is selected. The problem may be mitigated to some extent by reserving a section of the screen, as shown to the left of the display area in FIG. 2, which cannot be overlaid, for icons representing predetermined destination objects but this solution has only limited application and cannot provide for all possible destinations in the open layers.

Figure 3:
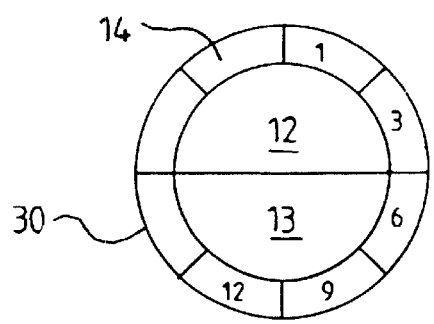
FIG. 3 illustrates the layer select icon displayed in FIG. 2.

In accordance with the invention the operating system generates and displays a special layer select icon 30 which in the preferred embodiment is configured in the form of an aperture or tunnel, as shown in FIG. 3. In the present embodiment this is effected by incorporating into the operating system routines which perform the procedures described below with reference to FIG. 4. As will be appreciated by those skilled in the art, it may equally be effected by providing a separate module which is called when data transfer operations are initiated.

The aperture in the layer select icon 30 is divided into two zones 12 and 13 and surrounded by a layer identifier ring 14 which indicates the layers available for display as identified in the layer list 21 maintained by the operating system. As with all the other icons displayed, the layer select icon 30 is stored in the icon library maintained by the operating system.

Figure 4:
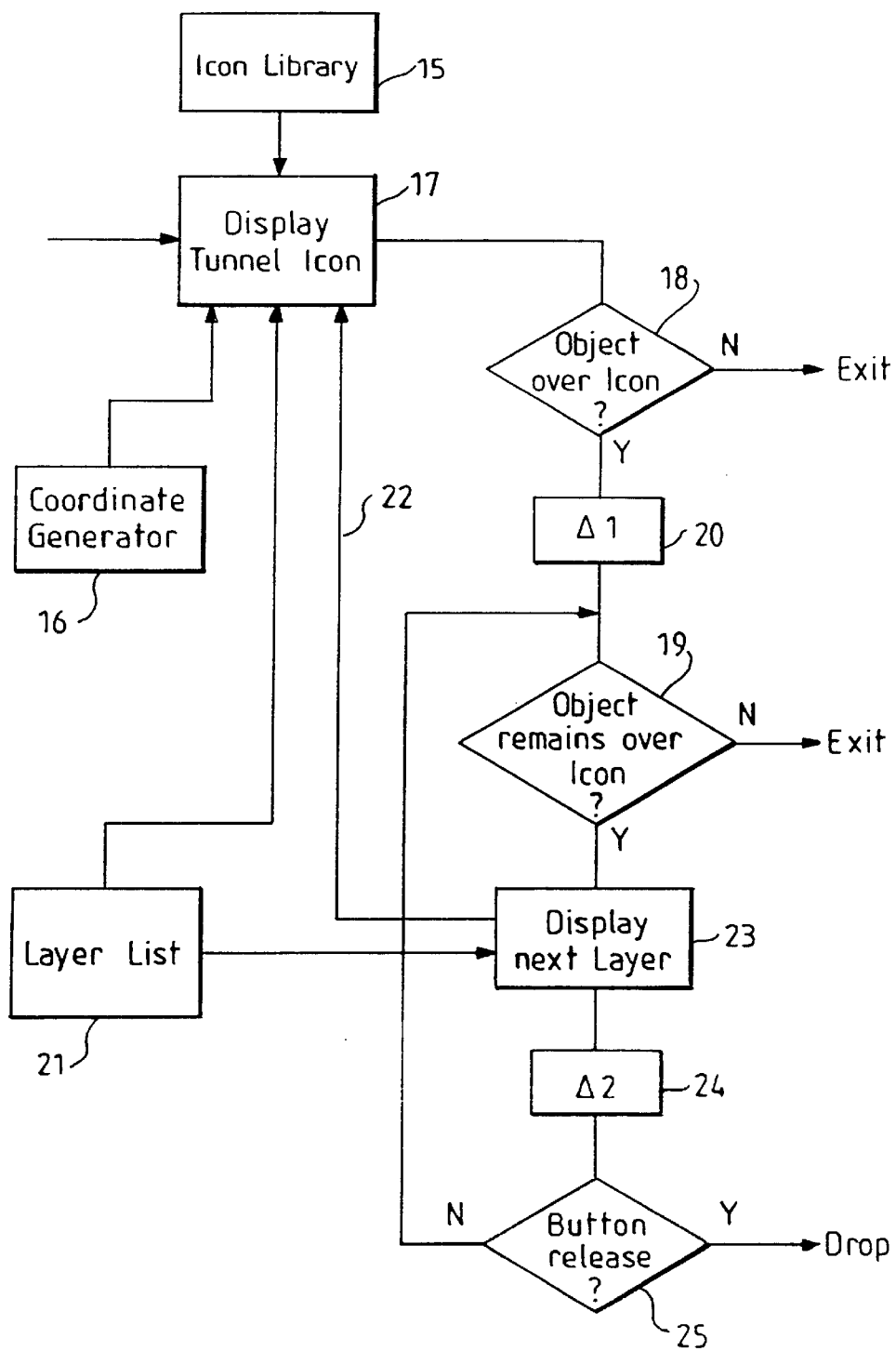
FIG. 4 is a flow diagram of the relevant portion of an operating system for a digital computer embodying the present invention.

FIG. 4 shows the operations performed by a system embodying the present invention. Referring to FIG. 4, the image of the tunnel icon is recovered from the icon library 15 and displayed at 17 in a fixed position on the screen under the control of a coordinate generator 16. The positioning of the tunnel icon is preferably controlled so that it appears in the same position in each open layer displayed so that the operator can readily locate it. Alternatively it may be positioned so that it appears in the reserved portion of the screen. A test is then made at 18 to determine whether an object has been dragged over the tunnel icon by the operator. If not, the operating system exits to normal routine operation on the current layer. If however an object has been dragged over the icon a further test is made at 19 after a predetermined delay 20. This delay ensures that the passage of the object over the icon is not merely the result of normal operations of the mouse but results from a deliberate intention to initiate a drag and drop operation involving another layer. If the object has remained over the icon after the delay 20 the system identifies the next layer in the layer list 21 and displays it at 23 for the operator to determine whether the selected target location is in this layer. At the same time a signal is fed over a line 22 highlighting the layer currently displayed in the layer identifier ring 14 of the tunnel icon.

After a further delay 24 which is chosen to provide time for the operator to make his determination a test is made at 25 for the release or otherwise of the relevant mouse button. If the button has been released, indicating that the operator has elected to "drop" the source icon, the transfer operation is performed and the operating system exits to normal operation. However if the button remains depressed the cycle beginning with 19 is repeated until the operator finds the destination icon sought.

It is possible that the operator wishes to view layers which have been previously presented. This may be done by dividing the aperture of the tunnel icon into two zones 12, and 13 as shown in FIG. 3. If the source icon is positioned over zone 12 the system is caused to display the next layer as before at step 23. However if the icon is positioned over zone 13 the system is caused to display the previous layer permitting the layers previously presented to be examined again. A further refinement may be added to adjust the speed of scanning of the layers to be variable according to the position of the source icon in the respective zone thereby permitting the operator to scan across layers rapidly or slowly depending on the likelihood of occurrence of the target icon.

Figure 5:
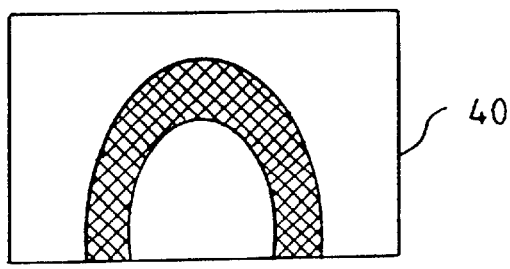
FIG. 5 illustrates an alternative layer select "tunnel" icon.

FIG. 5 shows a less sophisticated form of tunnel icon 40, which may be used instead of icon 30 in FIG. 2. Placing the dragged object over tunnel icon 40 after a suitable delay to filter out unintended positioning, simply causes the system to cycle progressively through the layers, pausing for a predetermined interval as each layer is displayed. There is no indication, other than the displayed layer itself of which layer is being displayed and progress through the layers is unidirectional and cyclic.

As with icon 30, selection of the desired layer is preferably made by moving the dragged object off the tunnel icon. Alternatively, the mouse button may be released.

Figure 6:
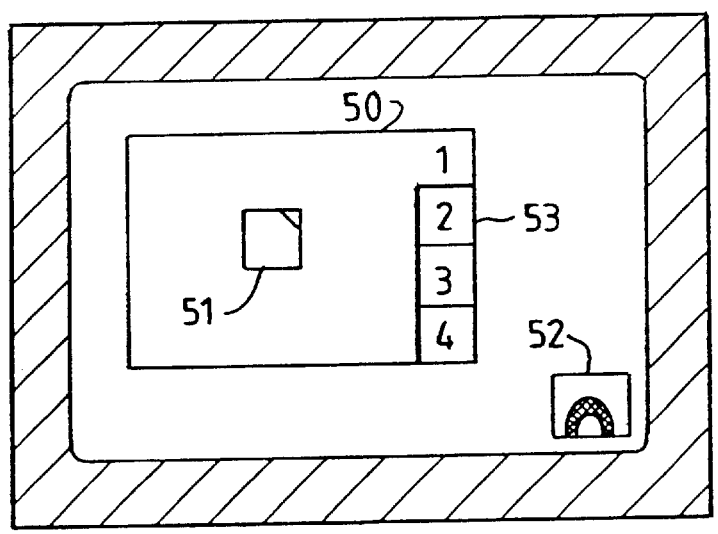
FIG. 6 illustrates a "Notebook" GUI representation with a tunnel icon, displaying a first layer.

The simple tunnel icon of FIG. 5 may be advantageously combined with known techniques of progressing through different layers. FIG. 6 shows the well known "Notebook" or "Property Control" representation 50, in which each layer is normally selected by pointing at and clicking on one of a number of tabs 53.

Such representation is used in IBM's WorkPlace for the OS/2 Operating System ("OS/2" is a trademark of International Business Machines Corporation registered in the United States and elsewhere) and in Microsoft's Windows '95 operating system ("Windows" is a registered trademark of Microsoft Corporation).

Figure 7:
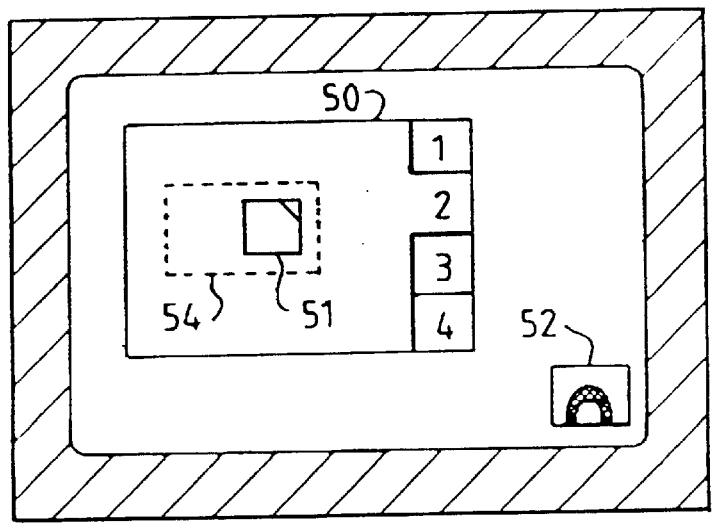
FIG. 7 illustrates the Notebook representation of FIG. 6 displaying a second layer, selected using the tunnel icon.

A tunnel icon 52, identical to icon 40 of FIG. 5, can be added to this representation. Dragging an object 51 over the icon 52 then causes cycling through the tabbed layers without operation of the mouse button to select them. When the desired layer, say layer 2 (FIG. 7) is reached, object 51 is moved off the tunnel icon to a drop area on object 54. The mouse button may then be released to drop the object 51 onto the new layer.

Figure 8:
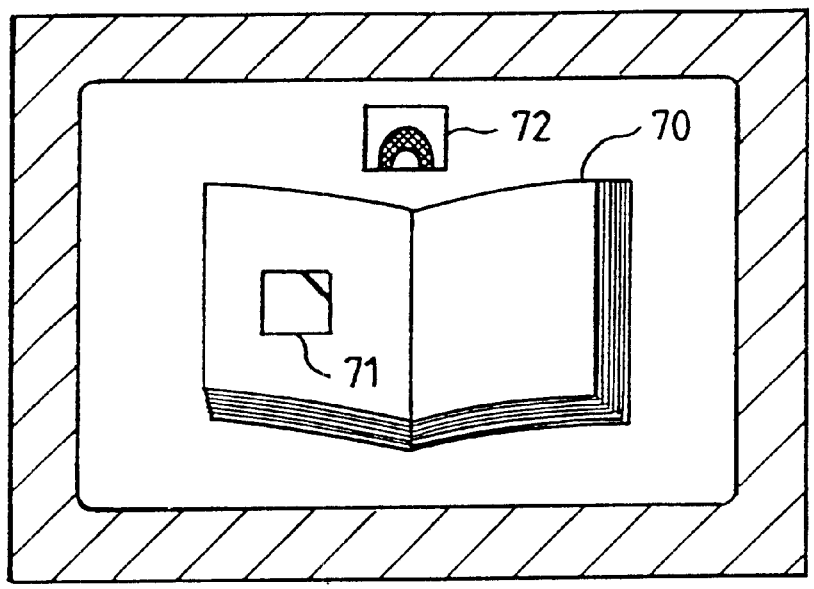
FIG. 8 illustrates a page turner GUI representation including a layer select tunnel icon.

FIG. 8 shows another well known "page turner" representation in which information is displayed in layers made to resemble pages of a book 70. It is normal to provide a button or the like to cause pages to turn when the mouse pointer is positioned on it and the mouse button is clicked.

In this embodiment, the tunnel icon 72 can be used in this conventional way to turn the pages or it can be used in the manner of the invention, that is, an object 71 to be dragged and dropped onto another layer is moved over the tunnel icon 72. This causes cycling through the pages as described for FIG. 7 until movement of the object 71 off the tunnel icon selects an appropriate page. Because of the relatively large number of pages, it is preferable to have a split tunnel icon so that positioning on the right hand side causes page turning in a forward direction and positioning on the left hand side causes page turning in a backward direction.

Figure 9:
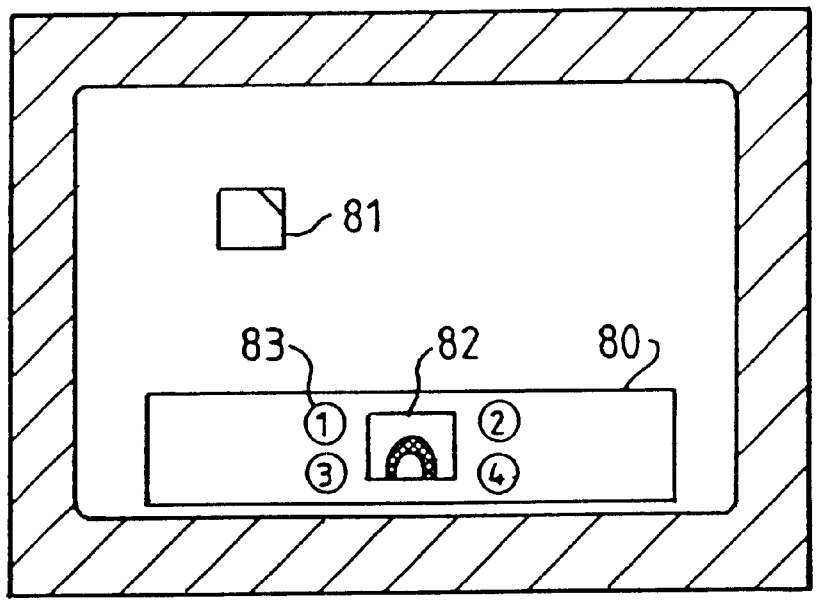
FIG. 9 illustrates a desktop GUI representation including a layer select tunnel icon.

Another variant illustrated in FIG. 9 is based on IBM's AIX Operating System DeskTop ("AIX" is a trademark of International Business Machines Corporation registered in the United States and elsewhere). In this system, desired layers are normally selected by pointing at and clicking on appropriate buttons 83 in a title or control bar 80. A tunnel icon 82 can be added which operates in much the same way as icon 52 in the Notebook representation of FIGS. 5 and 6.

I claim:

1. A method of transferring data between objects displayed as icons on different layers of a graphical user interface of a digital computer comprising a display and a pointing device, said graphical user interface including a layer select icon, said method comprising the steps of:

selecting a source icon representing a source object in one layer in response to a first operation of said pointing device;

causing successive layers of said graphical user interface to be presented to the user in response to a second operation of said pointing device to position the source icon on said layer select icon;

selecting a particular one of said successive layers in response to a third operation of said pointing device; and causing data transfer to be performed from said source object to said target object in response to a fourth operation of said pointing device to drag and drop said source icon onto a target icon representing a target object in the selected layer.

2. A method as claimed in claim 1, wherein said layer select icon is presented in each layered window in a predetermined position.

3. A method as claimed in claim 1, wherein said layer select icon is presented in a predetermined position in a reserved area of said interface.

4. A method as claimed in claim 1 wherein said layer select icon includes two zones, the presentation of successive layers being in forward or reverse sequence through a list of current layers depending on whether the source icon is positioned in one or other of said zones.

5. A method as claimed in claim 4, in which the speed of presentation of said successive layers is dependent on the part of the respective zone in which the source icon is positioned.

6. A method as claimed in claim 1 comprising stopping presentation of successive layers in response to a user movement of the source icon off the layer select icon, thereby selecting the currently presented layer for transfer.

7. A system for controlling the transfer of data between objects displayed on different layers of a graphical user interface in a digital computer comprising a display and a pointing device in response to user selection of a source icon representing a source object by operation of said pointing device and user dragging and dropping of said source icon on a target icon representing a target object, said system comprising:

means for generating and displaying a layer select icon so positioned on said interface as to be visible whenever any layer is displayed thereon;

sequencing means responsive to user positioning of said source icon on said layer select icon by operation of said pointing device to initiate successive presentation of said different layers;

selecting means for selecting one of said layers in response to operation of said pointing device; and data transfer means responsive to user operation of said pointing device to drag and drop said source icon on a target object in said one selected layer to transfer data from said source object to said target object.

8. A system as claimed in claim 7 in which said means for generating and displaying said layer select icon is adapted to locate said icon in the same position in each displayed layer.

9. A system as claimed in claim 7 in which said means for generating and displaying said layer select icon is adapted to locate said icon in a reserved position on said interface.

10. A system as claimed in claim 7 wherein said layer select icon includes two zones, the presentation of successive layers being in forward or reverse sequence through a list of current layers depending on whether the selected icon is positioned in one or other of said zones.

11. A system as claimed in claim 10, in which the speed of presentation of said successive layers is dependent on the part of the respective zone in which the selected icon is positioned.

12. A system as claimed in claim 7 in which said sequencing means is responsive to movement of said source icon off said layer select icon to cease presentation of successive layers at the layer currently presented, thereby selecting said currently presented layer for transfer.

13. A system as claimed in claim 7 in which said pointing device is a mouse device.

14. A system as claimed in claim 7 in which said sequencing means includes means for imposing a predetermined delay between presentation of successive layers, means for testing whether an icon remains positioned on said layer select icon at the end of said predetermined delay and means for advancing said presentation to the next layer in response to a positive test result from test testing means.

* * * * *